J. J. BOWES, Jr.
HOSE COUPLING.
APPLICATION FILED JULY 18, 1913.
1,093,528.
Patented Apr. 14, 1914.
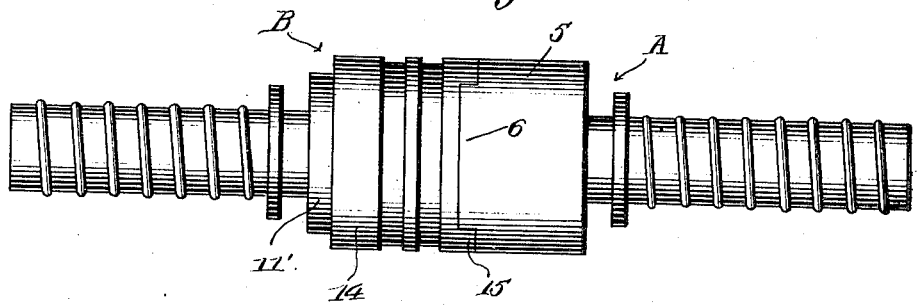
Fig. 1.
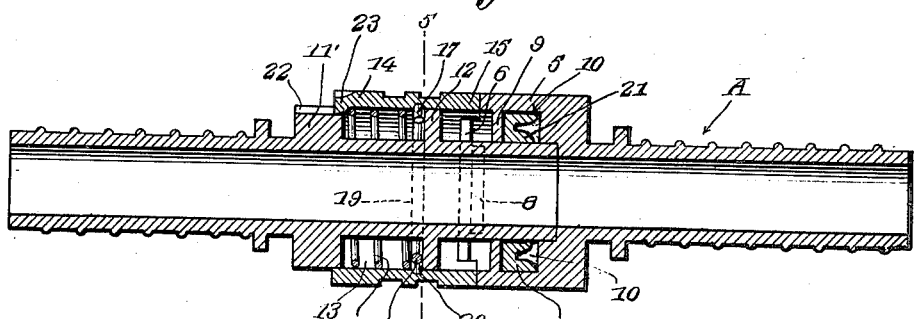
Fig. 2.
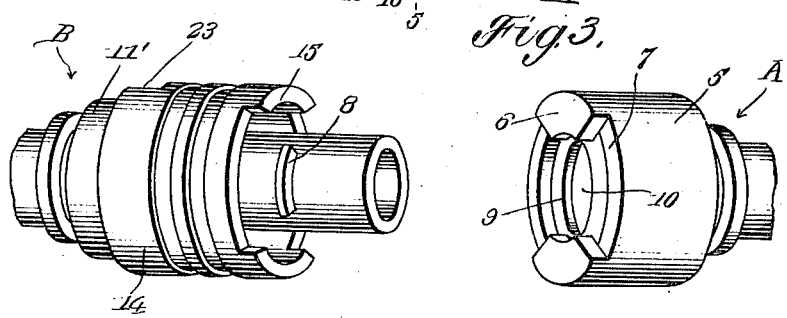
Fig. 3.
Fig. 4.
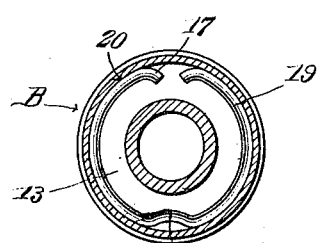
Fig. 5.
Witnesses
Inventor
J. J. Bowes, Jr.
By Victor J. Evans
Attorney

UNITED STATES PATENT OFFICE.

JOHN J. BOWES, JR., OF PENSACOLA, FLORIDA.

HOSE-COUPLING.

1,093,528.  Specification of Letters Patent.  Patented Apr. 14, 1914.

Application filed July 18, 1913. Serial No. 779,842.

*To all whom it may concern:*

Be it known that I, JOHN J. BOWES, Jr., a citizen of the United States, residing at Pensacola, in the county of Escambia and State of Florida, have invented new and useful Improvements in Hose-Couplings, of which the following is a specification.

The invention relates to couplings, and more particularly to the class of hose couplings, the same being improvements on the construction disclosed in Letters Patent No. 699,366, issued to me on the 6th day of May, 1902.

The primary object of the invention is the provision of a hose coupling wherein the improved features thereof enable the proper seating of the resilient element for tensioning the displaceable locking sleeve carried by one of the members of the coupling and also prevent the rotation of the said sleeve relative to the parts supporting the same when in the act of joining or detaching the members of the coupling.

Another object of the invention is the provision of a coupling wherein the coöperating parts thereof are assembled in a unique manner so as to permit the easy and quick connection of the members of the coupling or the detachment of the same from each other, the members when connected will render the coupling water-tight so as to avoid leakage, and also such members can be automatically locked together in coupled position.

A further object of the invention is the provision of a coupling of this character which is extremely simple in construction, thoroughly reliable and efficient in its purpose, readily and easily coupled and uncoupled, and also which is inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a side elevation of a hose coupling constructed in accordance with the invention, the members thereof being coupled. Fig. 2 is a vertical longitudinal sectional view of the same. Fig. 3 is a perspective view of the female member of the coupling. Fig. 4 is a similar view of the male member of the coupling. Fig. 5 is a sectional view on the line 5—5 of Fig. 2.

Similar reference characters indicate corresponding parts throughout the several views in the drawing.

Referring to the drawing in detail, A designates the female member of the coupling having an enlarged head 5 provided at diametrically opposite points with inwardly projecting substantially quadrant-shaped flanges 6, and in its edges intermediate said flanges with recesses 7, and at a suitable distance in rear of said flanges to permit of the insertion of lugs 8 behind the flanges 6 is an annular flange 9 forming an abutment wall for the lugs 8 when inserted in the female member A for locking engagement with the flanges 6 on its head. This annular flange 9 also serves as a wall to a pocket 10 arranged rearwardly thereof and into which is fitted a substantially U-shaped gasket or washer 11, the latter serving to prevent leakage when the female member A receives the male member B, which is hereinafter more fully described.

The male member B of the coupling is provided on its exterior with the segmental lugs 8 which when said member is inserted in the head 5 by a slight twisting of either member is adapted to engage behind the flanges 6 and thus secure the members against longitudinal displacement. The quadrant-shaped lugs 8 are preferably a little less than a quadrant to permit of their ready insertion between the flange 9 and the opposed flanges 6 of the head. The male member B is formed with annular shoulders 11' and 12 respectively, providing an annular recess 13 therebetween, the said shoulders being located exteriorly of the member B and have mounted thereon for longitudinal movement a locking sleeve or ring 14 provided with extensions 15 which are adapted to engage in the recesses 7 in the head 5 to secure the members of the coupling against relative rotary movement and thereby lock them against accidental uncoupling.

Located within the recess 13 and surrounding the male member B of the coupling is an expansion spring 16 having one end resting against the shoulder 11', while the opposite end is adapted to rest against the inwardly bent terminals 17 and an opposite inward curvature 18 respectively of a split snap ring 19, the same being adapted to snap into for locking engagement in an annular groove 20 formed in the inner surface of the locking sleeve or ring 14, and in this manner the said spring 16 is properly seated against both the ring 19 and the shoulder 11' so that the tension of the spring will be exerted against the sleeve or ring 14 for automatically shifting it to locking position.

As heretofore stated, the gasket or washer 11 is approximately U-shaped in cross section and has the lips 21 thereof tapered. The washer 11 is carried within the head 5 in the pocket 10 therein, and when the members are coupled together as illustrated in Figs. 1 and 2 of the drawing the lips 21 spread, closing the space between the inner walls of the head 5 and the outer surface of the member B. It will be apparent that from the above construction of the washer the water will in passing through the coupling force the lips 21 apart and against the two members, and that the washer is held against displacement by the inner closed end of the head 5 and the flange 9 which retains the washer within the head ready to receive the male member B of the coupling.

The shoulder 11" on the male member B of the coupling is formed with a longitudinally disposed guide channel or groove 22, while the sleeve or collar 14 at the edge adjacent to the said shoulder is instruck to provide a guide lip or projection 23 which is correspondingly shaped to the groove or channel 22 for engagement therein. Thus, in this manner the sleeve or collar 14 is prevented from relative rotation on the member B, yet permitting it to freely slide longitudinally thereon against the resistance of the spring 16 when coupling the members of the coupler.

From the foregoing it is thought that the construction and manner of operation of the device will be clearly understood, and therefore a more extended explanation has been omitted, and also that changes, variations and modifications may be made in the structure such as come properly within the scope of the appended claim, without departing from the spirit of the invention or sacrificing any of its advantages.

What is claimed is:

A coupling comprising male and female members, spaced annular shoulders formed on the male member, a coiled spring surrounding the male member between the shoulders, a sleeve arranged concentrically with respect to the shoulder and slidably supported thereby, the said sleeve being formed with an annular groove in its inner face, a resilient split ring engaged in the said groove to form a seat for one end of the spring and also to serve as an abutment for one of the annular shoulders, the other shoulder being formed with a groove arranged longitudinally with respect to the male member, an instruck lip formed on the sleeve and projected into the last-named groove for sliding movement therein, and means on the female member for receiving a portion of the male member and having means for interlocking engagement with the same and the said sleeve.

In testimony whereof I affix my signature in presence of two witnesses.

JOHN J. BOWES, Jr.

Witnesses:
E. EDMONSTON, Jr.,
FRANK O. PARKER.